United States Patent [19]

Hamamoto et al.

[11] Patent Number: 4,986,646
[45] Date of Patent: Jan. 22, 1991

[54] ELECTRIC REARVIEW MIRROR DEVICE FOR A VEHICLE

[75] Inventors: Tadanao Hamamoto; Tadashi Wakiya; Kazunari Hayashi, all of Aichi, Japan

[73] Assignee: Kabushiki Kaisha Tokai Denki Seisakusho, Aichi, Japan

[21] Appl. No.: 378,803

[22] Filed: Jul. 12, 1989

[30] Foreign Application Priority Data

Jul. 13, 1988 [JP] Japan ............................... 63-174442

[51] Int. Cl.$^5$ ........................... B60R 1/08; G02B 7/18
[52] U.S. Cl. ..................................... 350/637; 350/604;
350/606; 350/633; 318/466; 318/468
[58] Field of Search ............... 350/604, 606, 626, 637,
350/605, 632, 633, 634, 636; 318/466, 468;
307/10.1

[56] References Cited

U.S. PATENT DOCUMENTS 4,798,967  1/1989  Yamana et al. ..................... 350/637
4,940,322  7/1990  Hamamoto et al. ................ 350/637

FOREIGN PATENT DOCUMENTS 3609695   9/1986  Fed. Rep. of Germany ...... 350/637
0107936   7/1982  Japan ................................... 350/604
0053537   3/1983  Japan ................................... 350/637
0115748   6/1986  Japan ................................... 350/604
0050247   3/1987  Japan ................................... 350/637
2006475A  5/1979  United Kingdom .
2006990A  5/1979  United Kingdom .

Primary Examiner—Bruce Y. Arnold
Assistant Examiner—R. D. Shafer
Attorney, Agent, or Firm—Finnegan, Henderson, Farabow, Garrett, and Dunner

[57] ABSTRACT

The electric rearview mirror system comprising a position sensor which outputs a position signal showing the rotational position of the mirror body, memory device which stores the position signal from the position sensor at a prescribed sampling period, and a motor control circuit which judges the rotational direction of the mirror body based on the change with time of the position signal stored in the memory device and turns off the motor when the judged direction of the motor is opposite to the rotational direction of the mirror body due to the mirror driving mechanism.

8 Claims, 4 Drawing Sheets

ELECTRIC REARVIEW MIRROR DEVICE FOR A VEHICLE

FIELD OF THE INVENTION

The present invention relates to an electric rearview mirror device for a vehicle equipped with a mirror body which can be turned by remote control from the interior of the vehicle.

BACKGROUND OF THE INVENTION

In motor vehicles of recent years, automatic control of the operation of electrical equipment is widely in practice, for example, the electric rearview mirror device for motor vehicle has already been developed. An electrically driven door mirror which is an example of such a kind of equipment is composed, as is well known, of a mirror body enclosed turnably in a mirror housing provided protruding from a door of a motor vehicle. The mirror housing mounts therein a mirror driving mechanism including a first motor for turning the mirror body in the vertical direction and a second motor for turning the mirror body in the horizontal direction.

In the door mirror thus constructed, it is customary to add a mechanism for automatically turning the mirror body to a desired and predetermined position in response to a one-touch operation of operation means. In such a case, there are provided, more specifically, a first and a second position sensors for detecting the vertical and the horizontal positions, respectively, of the mirror body, and memory means for storing data corresponding to the vertical and the horizontal positions that are preset. In addition, there is provided a control circuit which operates, when the operating means is activated the mirror driving mechanism until the detected outputs of the first and the second position sensors coincide with the stored contents of the memory means.

Moreover, in an electrically driven door mirror of general type, there is provided a spring which absorbs the turning force of the first and the second motors when the turning of the mirror body is brought to a locked condition, in order to prevent the generation of inconveniences in the mirror driving mechanism when the turning of the mirror body is locked.

With the conventional constitution as in the above, when an abnormal condition of the mirror is developed, for example, in the position sensors or the memory means, there may arise a case in which the detected outputs of the position sensors and the stored contents of the memory means during the operation of the mirror driving mechanism do not coincide even after a long time. When such a situation occurs, the operation of the mirror driving mechanism will become to be continued unwittingly under the condition where the mirror body is locked at its position of maximum turning. This means that the mirror driving mechanism is left continuously in an overloaded condition, which may bring about a reduction of the life time of the mirror driving mechanism due to a deterioration in its driving system in spite of the fact that there is provided a spring for absorbing the rotational force of the motor, as mentioned above.

In addition, when the turning of the mirror body is locked, for example, by a foreign material which is bitten by the driving parts of the mirror driving mechanism, the mirror driving mechanism will be left under an overloaded condition similar to the above. Further, as a result of the spring provided as mentioned above, when the mirror body is locked during the operation of the mirror driving mechanism, the mirror body vibrates periodically between the turning position where it is brought to the locked condition and a turning position slightly before the locked position under the reaction at the time of absorption of the turning force of the motor due to the spring. There is created a problem that this vibration gives a unpleasant feeling to the operator of the device.

SUMMARY OF THE INVENTION

The present invention was contrived in view of the aforementioned circumstances. It is, therefore, an object of the present invention to provide an electric rearview mirror device for motor vehicle which is capable of canceling an overloaded condition of the mirror driving mechanism surely and quickly when the mirror driving mechanism is brought to an overloaded condition as a result of locking of the turning of the mirror body, and enables to realize the prolongation of the life and to attain the prevention of vibration of the mirror body.

The above and other objects of the invention have been achieved by a provision of an electric rearview mirror device for motor vehicle which, according to the present invention, has a mirror body that is turnable with respect to a mirror housing, and a mirror driving mechanism comprising a spring which in the event of locking of the rotation of the motor for rotating the mirror body as well as the mirror body absorbs the rotational force of the motor.

Such an electric rearview mirror device comprises a position sensor which outputs a position signal showing the rotational position of the mirror body, memory means which stores the position signal from the position sensor at a prescribed sampling period, and a motor control means which judges the rotational direction of the mirror body based on the change with time of the position signal stored in the memory means and turns off the motor when the judged direction of the motor is opposite to the rotational direction of the mirror body due to the mirror driving mechanism.

The position sensor outputs a position signal showing the rotational position of the mirror body, and the memory means stores the position signal at a prescribed sampling cycle. Accordingly, it becomes possible to find the turning direction of the mirror body based on the stored contents, namely, the motor control means judges the rotational direction of the mirror body based on the changes in time of the position signal stored in the memory means.

Now, when the turning of the mirror body is brought to a locked condition, namely, when the mirror body is brought to an overloaded condition, during the turning of the mirror body by means of the mirror driving mechanism, the spring absorbs the rotational force of the motor by its sliding action. At the same time, the turning direction of the mirror body is instantaneously reversed by the reaction acting at the time of absorption of the rotational force. Then, the motor control means that judges the turning direction of the mirror body as mentioned above turns off the motor of the mirror driving mechanism when the turning direction of the mirror body is reversed. In this way, the overloaded condition of the mirror mechanism is released.

PREFERRED EMBODIMENT OF THE INVENTION

Figure 1:
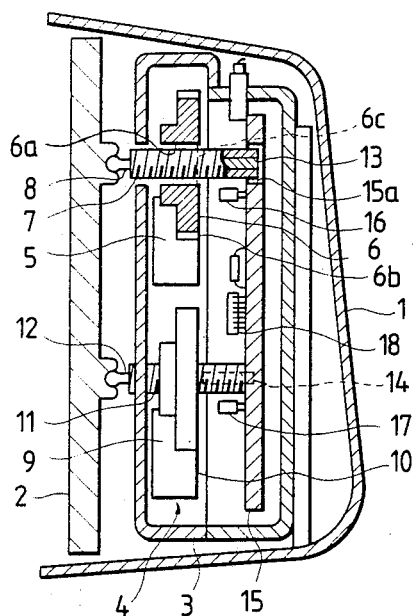
FIG. 1 is a vertical sectional diagram showing the mechanical construction of the electrically driven mirror.

Referring to the drawings, an embodiment of the present invention as applied to the door mirror will be described in detail as follows. Since in this case, door mirrors on the left-side and on the right-side have symmetrical forms and substantially the same structure as each other, description will be made only on the right-hand side door mirror.

In FIG. 1, a mirror housing 1 is supported turnably by the door of the motor vehicle. A mirror body 2 is housed within the mirror housing 1, and the central part of its rear side is supported turnably by a case 3 provided in the mirror housing 1 via a universal joint not shown.

The case 3 mounts therein a drive unit 4 working as the mirror driving mechanism. The drive unit is provided with a first driving motor 5 for turning the mirror body 2 in reciprocating manner along the vertical direction, and a gear plate 6 rotated by the motor 5, consisting of an externally threaded gear 6b that has a circular opening 6a and a ringlike spring 6c that is variably expansible with respect to the externally threaded gear 6b and is installed so as to traverse the circular opening 6a. The externally threaded gear 6b is meshed with a driving gear located on the side of motor 5 which is not shown.

The drive unit 4 also includes a first gear rod 7 which is set so as to be meshed with the spring 6c in the condition penetrating through the circular opening 6a and the spring 6c. Accordingly, such a gear rod 7 can move in the axial direction of the shaft in response to the forward and reverse rotations of the gear plate by the first motor 5. One end (the left end in FIG. 5) of the first gear rod 7 is linked turnably via a linking universal joint 8 to a position above that of the supporting universal joint, which is not shown, on the rear side of the mirror body. Therefore, the mirror body 2 is turned in the vertical direction in response to the reciprocating motion of the first gear rod 7 accompanying the forward or reverse motion of the first motor 5. When the turning (motion in the axial direction of the first gear rod 7) of the mirror body 2 is locked during its turning motion in the vertical direction, the rotational force of the first motor 5 is absorbed by the sliding of the spring 6c so as to override the thread ridges of the gear rod 7.

Further, the driving unit 4 comprises a second motor 9 for reciprocating the turning of the mirror body 2 in the horizontal direction, and a gear plate 10 which is rotated by the motor 9 and is constructed including a spring for absorbing the rotational force of the second motor 9, and the like, analogous to the gear plate 6.

A second gear rod 11 is provided to the gear plate 10 in a condition similar to that of the first gear rod 7 with respect to the gear plate 6. Therefore, the second gear rod 11 moves reciprocatingly in its axial direction by the second motor 9 in response to the forward and reverse rotations of the gear plate 10. One end (left end in FIG. 1) of the second gear rod 11 is linked via a linking universal joint 12 to a position on the left side of the supporting universal joint, which is not shown, on the rear side of the mirror body 2. Accordingly, the mirror body 2 is turned in the horizontal direction in response to the reciprocating motion of the second gear rod 11 accompanying the forward or reverse rotation of the second motor 9. Of course, when the turning (motion in the axial direction of the second gear 11) in the horizontal direction of the mirror body 2 is locked during its turning motion, the rotation force of the second motor 9 is absorbed by the sliding of a spring which is not shown to override the thread ridges of the gear rod 11.

There are also provided rodlike permanent magnets 13 and 14 buried concentrically in the gear rods 7 and 11, respectively, and are magnetized so as to have "N" and "S" poles on both ends of their axes. A printed substrate 15 is housed in the case 3, and the first and the second gear rods 7 and 11 are loosely inserted to through holes (only one of them is shown with symbol 15a). A first Hall IC 16 serves as a position sensor which is erected on the printed substrate 15, and is positioned so as to have prescribed distances from the first gear rod 7 and the permanent magnet 13. Further, a second Hall IC 17 serving as position sensor is erected on the printed substrate 15, positioned on the side of the second gear rod 11 and the permanent magnet 15 with prescribed spacings from them. The first Hall IC 16 outputs a position signal Sv which shows the position of the first gear rod 7, and hence the turning position in the vertical directions of the mirror body 2. The second Hall IC 17 outputs a position signal Sh which shows the position of the second gear rod 11, and hence the turning position in the horizontal direction of the mirror body 2.

In addition, on the printed substrate 15 there is arranged a control circuit unit 18 besides the hall ICs 16 and 17. Referring to FIG. 2 to FIG. 5, the control circuit unit 18 and related constitution will be described in what follows.

Figure 2:
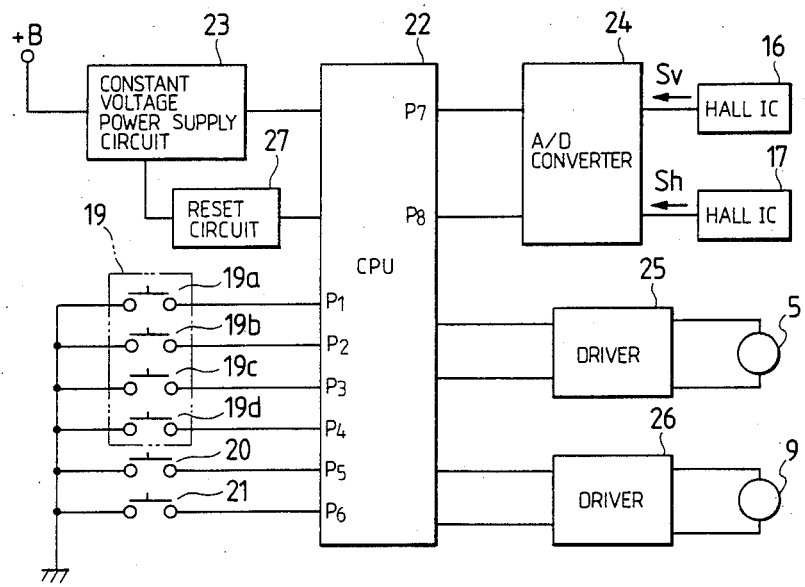
FIG. 2 is an overall electrical block diagram.

In FIG. 2, a collective switching device 19 is provided, for example, in the dash board of a motor vehicle which consists of self-resetting mirror switches 19a, 19b and 19c, 19d which are to be operated for turning the mirror body 2 of the right-side door mirror in the vertical and the horizontal directions, respectively. A memory switch 20 and a reset switch 21 are provided in the dash board of the motor vehicle, which may also be constructed in self resetting manner. In this case, one end of each of the switches 19a–19d, 20 and 21 are connected to a ground terminal, and each of their other ends is separately connected to the input terminals $P_1$–$P_6$ of a one-chip CPU 22 which is equipped with the functions of the memory means and the motor control means. Accordingly, on-signals consisting of low level signals are given to the input terminals $P_1$–$P_6$ of the one-chip CPU 22 in the condition in which the mirror switches 19a–19d, the memory switch 20 and the reset switch 21 are respectively in their on-states. Actually, there is provided a group of switches with similar constitutions as the respective switches 19a–19d, 20 and 21 for the left-side door mirror, and on-signals output corresponding to the on-operation are also input to the one-chip CPU 22.

The one-chip CPU 22 is set up in such a way that its power is supplied by the power terminal +B from a battery mounted on the vehicle through a constant voltage power circuit 23. In other words, such that power can be supplied even under the condition where the ignition switch of the vehicle is opened (OFF state). To input terminals P7 and P8, there are given position signals Sv and Sh from the first and the second Hall ICs 16 and 17, respectively, via an A/D converter 24. The one-chip CPU 22 is given a constitution by which it controls the first and the second motors 5 and 6 via drivers 25 and 26, respectively, as will be described later, based on the position signals Sv and Sh, on-signals from the respective switches 19a–19d, 20 and 21, and a program stored beforehand. Further, a power-on reset circuit 27 is driven by the constant voltage power supply circuit 23, and carries out initialization of the one-chip CPU 22 at the time of application of the power.

Figure 3:
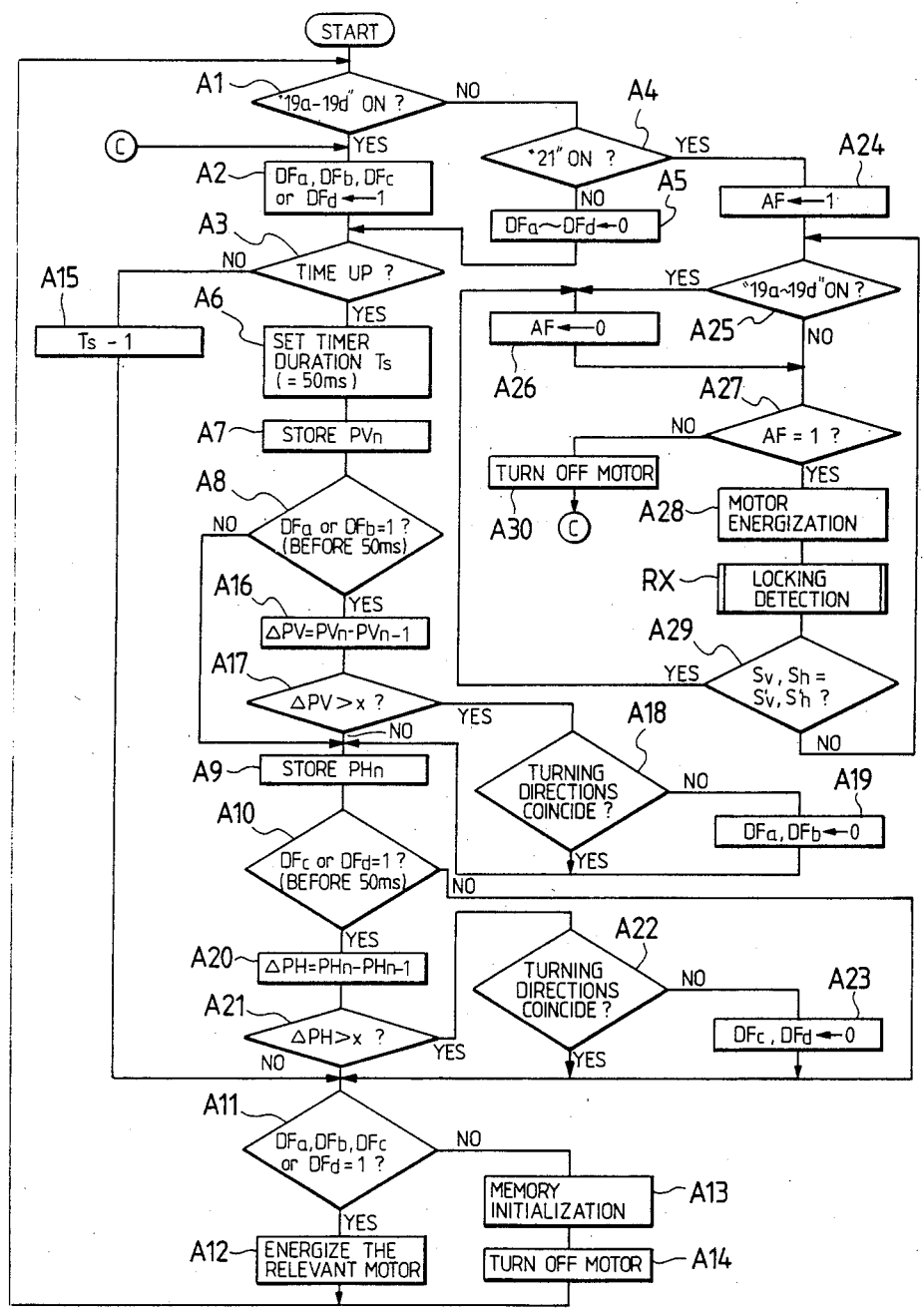
FIG. 3 and FIG. 4 are flow charts showing the contents of the control.
Figure 4:
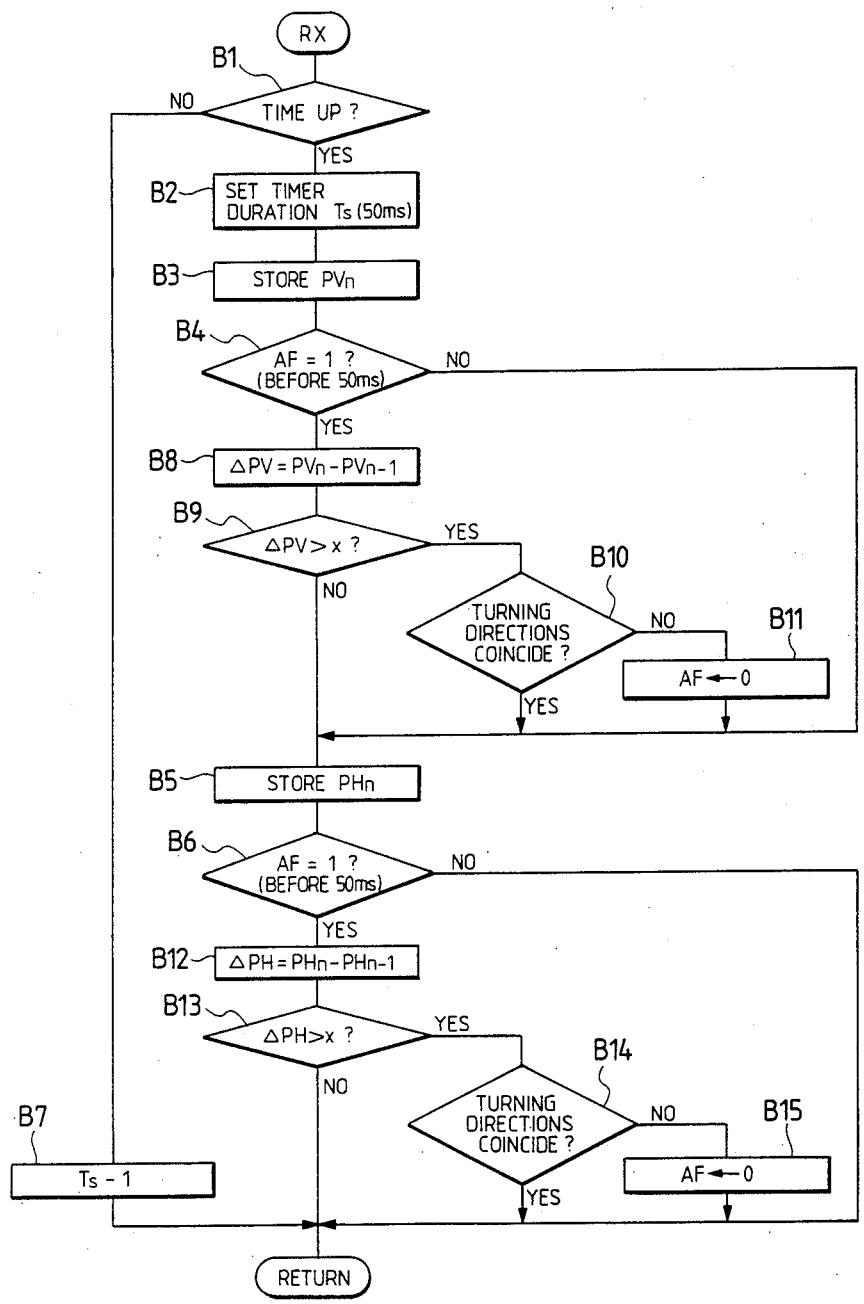

In FIG. 3 and FIG. 4, there is shown schematically a position which relates to the main part of the present invention of the control contents of the first and the second motors 5 and 9 by the one chip CPU 22. That portion will be described hereinbelow.

It is to be noted, although not shown in FIG. 3, that the one chip CPU 22 has a constitution to carry out an interruption routine when an on-signal is given from the memory switch 20, and in the interruption routine, the position signals Sv and Sh given from the first and the second Hall ICs 16 and 17 at that time are stored respectively as original position signals Sv' and Sh'. The operator closes the memory switch 20 in an optimal condition of turned position of the mirror body 2 for driving the vehicle (namely, the optimal turned position of the mirror body 2 for obtaining a reflected image of the rear view), thereby storing the original position signals Sv' and Sh' corresponding to the turned position.

In step A1 in FIG. 3, whether either one of the mirror switches 19a–19d is closed is judged, and when the answer is "yes", the operation flag corresponding to the motor related to the closed mirror switch. (As described below, the flags when the mirror switches 19a and 19b corresponding to the first motor 5 are closed will be represented by DFa and DFb, and the flags when the mirror switches 19c and 19d corresponding to the second motor 9 are closed will be represented by DFc and DFd) is changed to "1" (step A2), and then proceeds to step A3. When the judgement in step A1 is "no", in other words, when none of the mirror switches 19a–19d is closed, whether the reset switch 21 is closed is judged in step A4. When the answer is "no", the operation flags DFa–DFd are returned to "0" (step A5), and then moves to step A3. When the judgement in step A4 is "yes", namely when the reset switch 21 is formed closed, the routine of step A24 and thereafter that will be described later will be executed.

In step A3, whether the sampling timer constituted by an internal timer is in the time-up condition is judged, and when the answer is "yes", a timer duration Ts (50 ms, for example) is set (step A6). After execution of such a timer setting step A6, the position signal Sv from the first Hall IC 16 is stored as a position signal PVn indicating the turning position of the mirror body 2 in the vertical direction (step A7). Then, in step A8, whether the operation flag DFa or DFb for the first motor was "1" prior to the elapse of the time of 50 ms is judged (the condition in which either of the operation flag DFa or DFb is "1" corresponds to the condition that the first motor 5 has been driven).

When the judgement in step A8 is "no", the position signal Sh from the second Hall IC 17 is stored as the position signal PHn indicating the turning position of the second mirror body 2 in the horizontal direction at that time (step A9). Then, in step A10, whether the operation flag DFc or DFd has been "1" before 50 ms is judged (the condition in which the operation flag DFc or DFd is in "1" corresponds to the condition in which the second motor 9 has been driven, as will become clear). When the judgment in step A10 is "no", whether either one of the operation flags DFa DFd is "1" is judged in step A11. When the answer is "yes", namely, when one of the mirror switches 19a–19d is in the on-state, step A12 in which the motor corresponding to the operation flag that is set to "1" is electrically energized is executed, and then returns to step A1.

More specifically, in step A11, when the operation flag DFa is in the state of "1", the first motor 5 is supplied with a current in the forward direction to turn the mirror body 2 in the upward direction, when the operation flag DFb is in the state of "1", the first motor 5 is supplied with a current in the reverse direction to turn the mirror body 2 in the downward direction, when the operation flag DFc is in the state of "1", the second motor 9 is supplied with a current in the forward direction to turn the mirror body 2 in the leftward direction, and when the operation flag DFd is in the state of "1", the second motor 9 is supplied with a current in the reverse direction to turn the mirror body 2 in the rightward direction.

Further, when the judgement in step A11 is "no", in other words, when all of the mirror switches 19a–19d are opened with the operation flags DFa-DFd in the state of "0", step A13 which initializes the stored contents of the position signals PVn and PHn, and step A14 which turns off the motors 5 and 9 are executed before returning to step A1.

On the other hand, in the state where the judgment in step A3 is "no", in other words, in the state where the sampling timer which was set once is working, step A15 which decrements the timer duration Ts (=50 ms) of the sampling time by 1 ms is executed before moving to step A11. Therefore, the routine from step A6 to step A11 is executed whenever the sampling timer displays time-up, in other words, every time when the sampling time set to 50 ms elapse. As a result, in step A7 and step A9, position signals PVn and PHn for every elapse of 50 ms are stored, wherein the memory contents are arranged to be retained, for example, up to the previously stored position signals PVn-1 and PHn-1.

When the judgment is "yes" in step A8 following the above memory step A7, namely, when the first motor 5 was driven before the elapse of 50 ms, difference ΔPV between the stored position signal PVn at present and the stored position signal PVn-1 at the time 50 ms earlier is calculated (step A16). Then, in step A17, whether the calculated result ΔPV exceeds a predetermined displacement value x is judged. When the judgment in step A17 is "no", it moves to step A9. On the other hand, when it is judged "yes", it is judged in step A18 whether the actual turning direction of the mirror body 2 indicated by the sign of the calculated result ΔPV coincide with the commanded turning direction of the mirror body 2 specifiable by the operation flag DFa or DFb. When the judgment in step A18 is "yes", it proceeds to step A9, while the judgment is "no", step A19 in which the operation flags DFa and DFb are returned to "0" is executed before moving to step A9. When it is judged "no", after execution of step A19, in the subsequent step A11, there is executed step A14 so that the first motor 5 is turned off and the turning of the mirror body 2 stops. Further, when the judgment in step A10 is "yes", steps A20-A23 that are respectively analogous to steps A16-A19 will also be executed.

In summary, in a state where either one of the mirror switches 19a-19d is closed, the driving unit 4 is actuated by electrical energization of the first motor 5 or the second motor 9 to turn the mirror body 2 in either one of the directions of the vertical and horizontal directions. In addition, when the mirror switches 19a-19d open while in the above-mentioned state, the motors 5 and 9 are turned off and the turning of the mirror body 2 stops. Therefore, it is possible to turn the mirror body 2 to a desired position by selectively closing the mirror switches 19a-19d. In the state where the mirror body 2 is turned as in the above in response to the closing of either one of the mirror switches 19a-19d, the one-chip CPU 22 stores the position signals Sv and Sh from the Hall ICs 16 and 17 at a prescribed cycle (50 ms) by executing the steps A1-A23 in the prescribed order. At the same time, the direction of turning of the mirror body 2 is judged based on the change in time of the stored position signals PVn and PHn.

Figure 5:
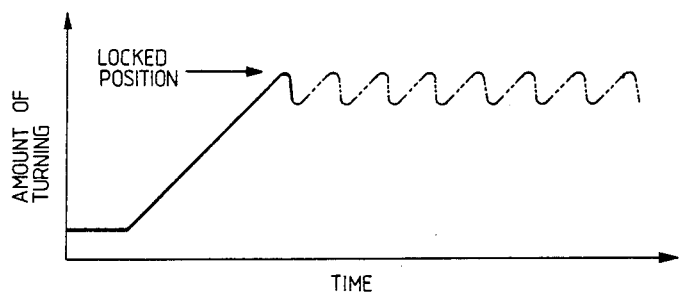
FIG. 5 is a characteristic diagram for explaining the action of the device.

When the judged turning direction is opposite to the turning direction of the mirror body 2 due to the driving unit 4, the motors 5 and 9 are turned off. In this case, when the turning of the mirror body 2 is locked due to biting of a foreign matter or the like by the driving system of the driving unit, the spring 6c or the spring not shown absorbs the turning force of the first motor 5 or the second motor 9 by its sliding action, and the direction of turning of the mirror body 2 is reversed by the reaction at the time of absorbing the turning force. Namely, when the turning of the mirror body 2 is locked, an overload is applied to the driving unit 4 by the reversal of the turning direction, and if the driving of the motor 5 or 9 is continued as is, the mirror body 2 starts to vibrate, as is shown in FIG. 5 showing the time change in the turning amount of the mirror body 2. However, when the turning of the mirror body is locked, the motor 5 or 9 is turned off immediately by the one-chip CPU 22 as described above, so that the overloaded condition of the driving unit 4 and the vibrations of the mirror body 2 is canceled quickly.

Returning to FIG. 3 to describe other control contents of the one-chip CPU 22, when the judgment in step A4 is "yes", namely, when the reset switch 21 is closed, the automatic reset flag AF is set to "1" in step A24. Then, whether either one of the mirror switches 19a-19d is closed is judged in step A25. When it is judged "yes" in step A25, step A26 in which the automatic reset flag AF is returned to "0" is executed, and proceeds to step A27, whereas when it is judged "no", it proceeds directly to step A27. In step A27, whether the automatic flag AF is "1" is judged, and when the answer is "yes", step A28 in which the first and the second motors 5 and 9 are energized is executed. In step A28, the first and the second motors 5 and 9 are energized so as to turn the mirror body 2 in the turning direction indicated by the original position signals Sv' and Sh' that were stored in advance. Following this, routine RX that will be described later and step A29 are executed in succession.

In step A29, whether the position signals Sv and Sh (namely, the current turning position of the mirror body 2) from the respective Hall ICs 16 and 17 coincide with the original position signals Sv' and Sh' is judged, and if the answer is "no", it goes back to step A25. Therefore, until the mirror body 2 is turned to the position indicated by the original position signals Sv' and Sh', step A25, step A27, routine RX and step A29 are executed repeatedly, thereby the turning of the mirror body 2 continues. Further, when it is judged "yes" in step A25 during the turning mentioned above, namely, when either one of the mirror switches 19a-19d is closed, the automatic reset flag AF is returned to "0", so that it will be judged "no" in step A27, and step A30 in which the motors 5 and 9 are turned off is executed and then it returns to step A2. Therefore, in this case, the routine of step A2 and thereafter will be executed as described in the foregoing.

Now, the routine RX has specific contents as shown in FIG. 4. Namely, the routine RX consists of step B1 to step B15 analogous to the routine consisting of step A3, step A6-step A10 and step A15-step A23, that is, the routine for detecting the locking of turning of the mirror body 2, only difference being that the automatic reset flag AF is returned to "0" in the routines B11 and B15. Accordingly, it is possible to detect the locking of the turning of the mirror body 2 by the routine RX, with the automatic reset flag AF being returned to "0" at the time of detection.

Consequently, if the mirror body 2 is locked at its maximum turning position due to generation of an abnormality in the Hall IC 16 or 17, or the turning of the mirror body 2 is locked due to biting of a foreign matter by the driving unit as mentioned before, during the state of continued turning of the mirror body 2, the motors 5 and 9 are immediately turned off by the sequential execution of steps A27 and A29, thereby stopping the enables continuation of the overloaded condition of the driving unit, suppressing prematurely the generation of vibrations of the mirror body 2. In particular, in this case, for the constitution for detecting the locked condition of the mirror body 2 and for turning off the motors 5 and 9 at the time of detection of a locked condition, the Hall ICs 16 and 17, the one-chip CPU 22 and the like that have been provided originally can be made use of. Therefore, there is required no addition or modification of the hardware constitution, and hence there is no possibility of complicating the constitution and a rise in the manufacturing cost.

Moreover, when it is judged "yes" in step A29, namely, when the mirror body 2 is turned to the position indicated by the original position signals Sv' and Sh', it goes back to step A26. Therefore, in this case, too, the motors 5 and 9 are turned off in step A27.

As described in the ,foregoing, when the mirror body 2 is locked during its turning, that is, when the driving unit finds itself in an overloaded condition, the one-chip CPU 22 turns of immediately the motors 5 and 9.

Figure 6:
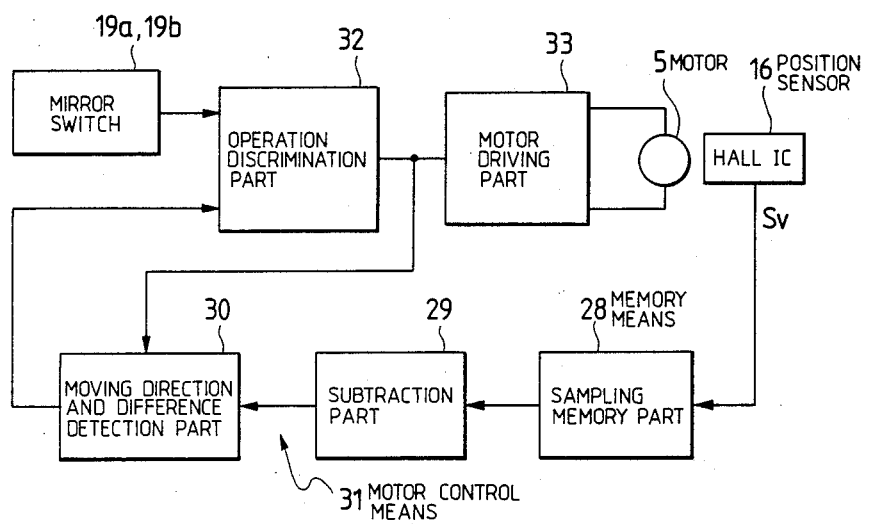
FIG. 6 is a diagram representing the electrical composition of important parts by the combination of functional blocks.

FIG. 6 shows a block diagram for the portion corresponding to the first motor 5, for example, out of the overload preventive mechanism of such a one-chip CPU 22. Namely, in FIG. 6, 28 is a sampling memory part which is a memory means, and corresponding to functions of steps A3, A6 and A7, stores the position signal Sv from the first Hall IC 16 at a prescribed cycle (50 ms).

A subtraction part 29 corresponds to the function of step A16 and a moving direction and difference detection part 30 corresponds to steps A17 and A18, and the motor control means 31 are constituted by these parts. In addition, an operation discrimination part 32 corresponds to the functions of step A1, A2, A4 and A5. This part outputs selectively a turning command signal for the mirror body 2 based on the on-signals from the mirror switches 19a and 19b (in reality, corresponding to the state of "1" of the operation flags DFa and DFb), and supplies it to a motor driving part 33 corresponding to steps A11-A14 and the moving direction and difference detection part 30 in the motor control means 31. In this case, the motor driving part 31 supplies a stop signal when the turning of the mirror body 2 is locked (in reality, corresponding to the state "0" of the operation flags DFa and DFb) to the operation discrimination part 32.

It should be noted that in the above-described embodiment, there is given a function which turns automatically the mirror body 2 to a position stored by the memory switch 20, but this function needs only be introduced as need arises.

As is clear from the description in the foregoing, in accordance with the present invention, when the mirror driving mechanism is brought to an overloaded condition due to locking of the turning of the mirror body, it is possible to securely and quickly cancel the condition based on the detection result on the turning direction of the mirror body. With this arrangement, there can be realized an excellent effect of prelonging the service life of the mirror driving mechanism part and presenting the generation of vibrations of the mirror body when the turning is locked.

What is claimed is:

1. An electric rearview mirror system for use in a vehicle, comprising:
   a housing supported by said vehicle;
   a mirror body mounted turnably in said housing;
   means for driving said mirror body in a selected turning direction, said mirror body driving means having spring means connected to said mirror body for absorbing a rotational force of said mirror driving means;
   means for detecting a position of said mirror body;
   means for storing an output of said position detecting means at a predetermined sampling period; and
   means for controlling said mirror body driving means, said controlling means having means for stopping the operation of said mirror driving means whenever an incremental turning of said mirror body is detected in a direction opposite said selected turning direction, said incremental turning being caused by a recoil of said spring means.

2. The electric rearview mirror system of claim 1, wherein said mirror body driving means comprises:
   a first motor turning said mirror body along a vertical direction with respect to said vehicle;
   a second motor turning said mirror body along a horizontal direction with respect to said vehicle;
   a first gear plate rotated by said first motor, said first gear plate having an opening and a first spring;
   a second gear plate rotated by said second motor, said second gear plate having an opening and a second spring;
   a first gear rod threadably engaged with said first spring, said first gear rod moving in an axial direction of said first gear plate, said first gear rod being connected to said mirror body; and
   a second gear rod threadably engaged with said second spring, said second gear rod moving in an axial direction of said second gear plate, said second gear rod being connected to said mirror body;
   wherein a rotational force of said first and second motors are absorbed by a sliding of said first and second springs so as to override thread ridges of said first and second gear rod, respectively.

3. The electric rearview mirror system of claim 1, wherein said mirror body driving means is disposed within said housing.

4. The electric rearview mirror system of claim 1, further comprising means for operating said mirror body driving means, said operating means being provided in a vehicle compartment.

5. The electric rearview mirror system of claim 1, wherein said mirror body position detecting means comprises a Hall IC.

6. The electric rearview mirror system of claim 1, further comprising means for automatically turning said mirror body to a position stored in said storing means.

7. The electric rearview mirror system of claim 1, further comprising a constant voltage power supply circuit connected to a battery of said vehicle, said constant voltage power supply circuit supplying a power voltage to said electric rearview mirror system.

8. An electric rearview mirror system for use in a vehicle, comprising:
   a housing supported by said vehicle;
   a mirror body mounted turnably in said housing;
   means for driving said mirror body in a selected turning direction, said driving means having
      a first motor turning said mirror body along a vertical direction with respect to said vehicle,
      a second motor turning said mirror body along a horizontal direction with respect to said vehicle,
      a first gear plate rotated by said first motor, said first gear plate having an opening and a first spring,
      a second gear plate rotated by said second motor, said second gear plate having an opening and a second spring,
      a first gear rod threadably engaged with said first spring, said first gear rod moving in an axial direction of said first gear plate, said first gear rod being connected to said mirror body, and
      a second gear rod threadably engaged with said second spring, said second gear rod moving in an axial direction of said second gear plate, said second gear rod being connected to said mirror body,
      wherein a rotational force of said first and second motors are absorbed by a sliding of said first and second springs so as to override thread ridges of said first and second gear rod, respectively;
   means for detecting a position of said mirror body;
   means for storing an output of said position detecting means at a predetermined sampling period; and
   means for controlling said mirror body driving means, said controlling means having means for stopping the operation of said mirror driving means whenever an incremental turning of said mirror body is detected in a direction opposite said selected turning direction.

* * * * *